(12) United States Patent
Heumüller

(10) Patent No.: US 8,657,891 B2
(45) Date of Patent: Feb. 25, 2014

(54) SHAPED WOOD FIBER BODY AS IGNITION AID

(76) Inventor: Jürgen Heumüller, Geiselwind-Wasserberndorf (DE)

( * ) Notice: Subject to any disclaimer, the term of this patent is extended or adjusted under 35 U.S.C. 154(b) by 513 days.

(21) Appl. No.: 12/608,690

(22) Filed: Oct. 29, 2009

(65) Prior Publication Data

US 2010/0107486 A1     May 6, 2010

(30) Foreign Application Priority Data

Oct. 31, 2008  (DE) .................... 20 2008 014 475 U
Dec. 9, 2008   (DE) .................... 20 2008 016 262 U

(51) Int. Cl.
    *C10L 11/00*          (2006.01)
(52) U.S. Cl.
    USPC .................................. 44/532; 44/533; 44/535
(58) Field of Classification Search
    USPC ................... 44/530, 532, 533, 535, 542
    See application file for complete search history.

(56) References Cited

U.S. PATENT DOCUMENTS

| | | | | |
|---|---|---|---|---|
| 864,021 A | * | 8/1907 | Muetzel | 44/533 |
| 912,554 A | * | 2/1909 | Foreman | 44/530 |
| 930,526 A | * | 8/1909 | Bloss | 44/521 |
| 2,107,054 A | * | 2/1938 | Haymond | 44/519 |
| 2,222,250 A | * | 11/1940 | Bowling | 44/535 |
| 3,973,922 A | * | 8/1976 | Williams | 44/535 |
| 4,518,394 A | * | 5/1985 | Templin et al. | 44/544 |
| 2009/0307968 A1 | * | 12/2009 | Parker | 44/535 |

FOREIGN PATENT DOCUMENTS

| | | |
|---|---|---|
| BE | 433 836 | 5/1939 |
| CH | 104 046 | 3/1924 |
| CH | 157 291 | 12/1932 |
| CH | 697 091 | 4/2008 |
| DE | 368 412 | 2/1923 |
| DE | 846 390 | 8/1952 |
| DE | 881 337 | 6/1953 |
| DE | 1 765 014 | 4/1958 |
| DE | 6927593 | 7/1969 |
| DE | 295 17 488 | 12/1995 |
| DE | 102 07 949 | 9/2003 |
| DE | 102 27 750 | 1/2004 |
| DE | 20 2005 015 466 U1 | 1/2006 |
| DE | 10 2005 011 803 | 9/2006 |
| EP | 1 338 640 | 8/2003 |
| WO | WO 2005/024305 | 3/2005 |

* cited by examiner

*Primary Examiner* — Cephia D Toomer
(74) *Attorney, Agent, or Firm* — Hamre, Schumann, Mueller & Larson, P.C.

(57) ABSTRACT

The invention relates to a shaped wood fiber body as an ignition aid with additional fuel content achieved by dipping or impregnation, wherein a plurality of wood fibers are compacted to form the shaped body. According to the invention, the preferably cylindrical body has a multilayered winding or roll structure, comprising a series of layers, which run at a radial spacing about the lengthwise axis of the cylinder. Furthermore, at least the bottom or the top surface of the cylindrical body is diagonal cut.

9 Claims, 1 Drawing Sheet

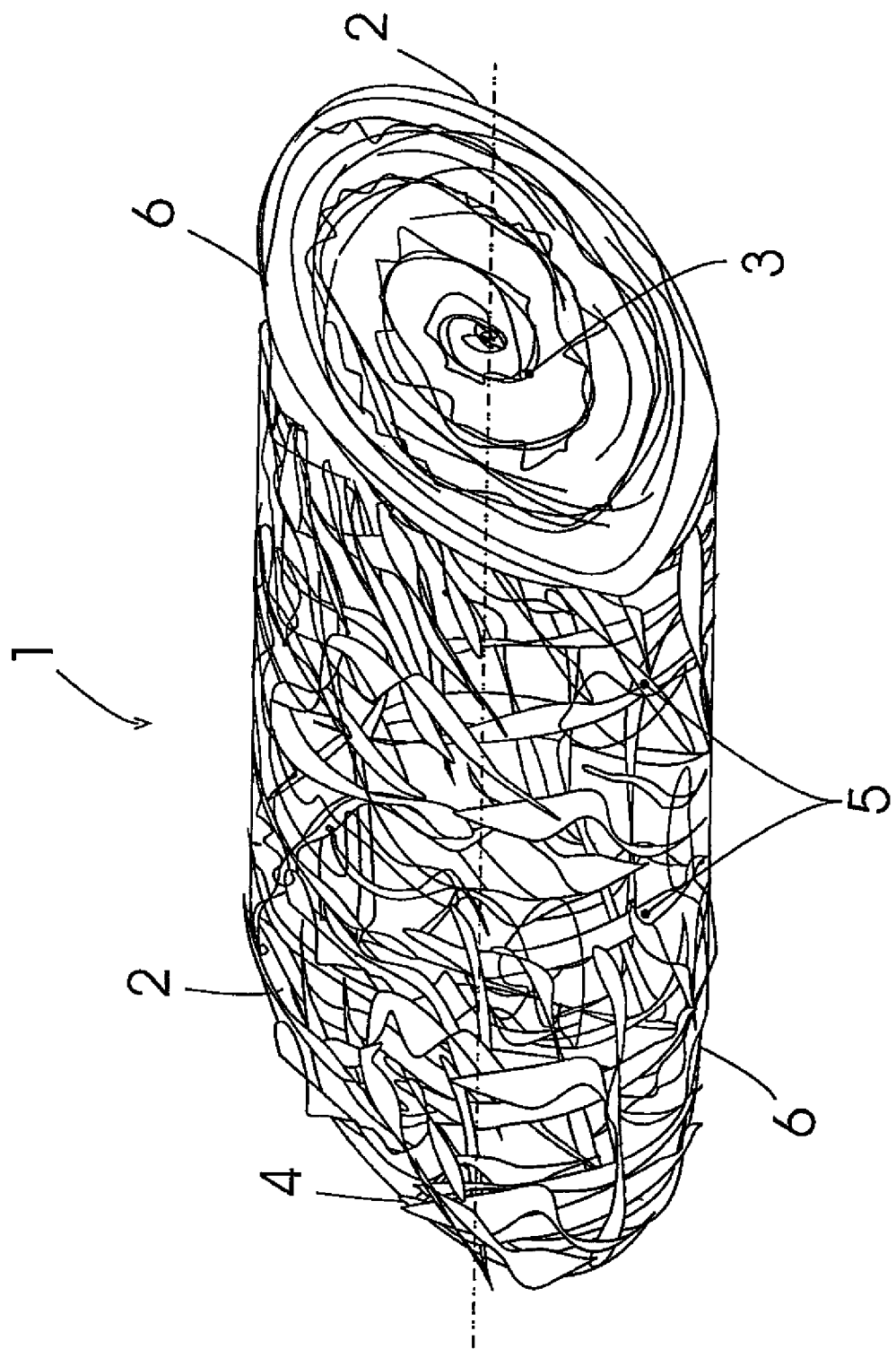

SHAPED WOOD FIBER BODY AS IGNITION AID

The invention relates to a shaped wood fiber body as an ignition aid with additional fuel content achieved by dipping or impregnation, wherein a plurality of wood fibers, especially excelsior are compacted to form the shaped body, according to the preamble of claim 1.

From DE 881 337 a manufacturing process for a fire starter is already known, wherein according to this method excelsior is dipped into a heated liquid mass or impregnated in it, the liquid mass serving as additional fuel, and possibly being paraffin.

The patent family DE 102 07 949 A1/EP 1 338 640 A1 discloses a fire starter of excelsior, especially for igniting a wood or coal fire, wherein the fire starter has at least one shaped body of excelsior. The fire starter begins with a shaped body, having a density in the range of 0.02 g/cm$^3$ to 0.15 g/cm$^3$, and making use of wood shavings having a width in the range of 1.0 mm to 6 mm and a thickness in the range of 0.1 mm to 0.5 mm. The shaped body of DE 102 07 949 A1 can have a cylindrical shape.

A more loose shaped body is known from DE 1 765 014, being formed as a fire starter and consisting essentially of oil bound to wood fibers. Furthermore, the loose shaped body can have potassium nitrate as an additive.

The ignition aid for solid fuels according to DE 102 27 750 A1 is a paraffin-impregnated, natural excelsior rope segment with a defined residual moisture content, wherein the paraffin forms a solid, waxlike paraffin core. The impregnating with the preheated paraffin occurs in the dip process, observing a predetermined dip time and a cooldown process. After the cooldown, the excelsior rope segment is in a solidified state and can be cut into pieces with a saw.

It has been found that, while the known ignition aids in the form of compacted excelsior bodies and provided with suitable fuel make possible a sufficient length of burning, which is enough to set fire to larger pieces of wood, the igniting of the ignition aid itself is very difficult. To improve the ignition properties, it is known, for example, from DE 295 17 488 U1, how to provide a wood and ignition aid assembly with a fuse that sticks out from the surface of the ignition aid assembly. But here as well there is a risk that the fuse will burn down, but still the wood components of the shaped body do not begin to burn.

From the foregoing, therefore, it is the problem of the invention to indicate a further developed shaped body as an ignition aid with additional fuel content, which has a sufficient burning time and which can be set on fire in simple manner with ordinary ignition aids.

The solution to the problem of the invention is achieved by a shaped, especially cylindrical, wood fiber or excelsior body as an ignition aid according to the combination of features of claim 1, while the subclaims contain at least expedient configurations and modifications.

Accordingly, one starts from a preferably, though not exclusively cylindrical shaped excelsior body as an ignition aid with additional fuel content, achieved by dipping or impregnation, wherein a plurality of wood fibers or a mixture of excelsior and wood shavings are compacted for form the shaped body.

According to the invention, the shaped body has a multilayered winding or roll structure, comprising a series of layers, which run at a radial spacing about the lengthwise axis of the shaped body, especially a cylindrical one.

In [one] embodiment of the invention, the radius of the series of layers increases constantly from the cylinder core outwardly to the envelope of the cylinder.

Each layer of the series of layers consists of randomly oriented wood fibers, such that the individual layers are in an adhesive connection with each other, and the desired stability of the shaped body, i.e., given the additional fuel content, remains intact.

In [one] embodiment of the invention, at least the bottom or the top surface of the cylindrical body is diagonal cut.

The diagonal cut angle in relation to the lengthwise axis of the cylinder lies in the range between basically 30° and basically 60°, preferably in the range between 35° and 55°.

Furthermore, it is possible to provide the diagonal cut surface with an ignition agent, for example, this ignition agent can be applied by a coating process.

It also lies within the sense of the invention to configure both the bottom and the top layer of the cylindrical body as a diagonal surface. The diagonal surface with its ends tapering nearly to a point now serves as the preferred ignition site, so that a uniform flame propagation occurs over the entire body of the cylinder. The burning of the ignition aid occurs steadily with uniform production of heat, so that firelogs or similar fuel can be safety and quickly ignited.

The diagonal cut enables a more secure grasping and a greater distance between hand and ignition aid.

The excelsior fibers used for the shaped body of the invention have a width of basically 0.5 mm to 3.5 mm, preferably 1.5 mm to 3.0 mm.

The shaped body of the invention can also be made from planing chips by compression, and when planing chips are used the above mentioned fiber dimensions can be different.

The distribution of the additional fuel increases in one embodiment from the cylinder core to the cylinder envelope.

The production of the excelsior shaped body is done by an arrangement of several press forming rolls. The press forming rolls execute a rotational motion directed toward each other. A predetermined amount of excelsior fibers is placed in a roll gap. The quantity of excelsior fibers is drawn into the roll gap and compressed there. Thanks to the layout of the rolls, a winding or roll structure of the shaped body is produced. The strength and shape stability of the products made in this way is much better than the prior art, since no easily untwisted spiral shape is formed.

In the ignition aids of the prior art, made by stranding, for example, a spiral of fibers is formed, following the stranding direction. Such ignition aids need to be untwisted against the spiral turning direction prior to use, in order for a secure ignition to occur. Such a manipulation is time consuming, on the one hand, and unpleasant on the other, since fuel located in and taken up by the shaped body, such as paraffin components, become loose and can get stuck to the hand of the user.

The invention shall now be explained more closely by means of a sample embodiment, as well as a FIGURE.

The FIGURE shows a perspective view of a shaped wood fiber body with diagonal cut.

As can be seen from the FIGURE, both the bottom and the top surface of the shaped body 1 there, i.e., both cylinder side surfaces, are formed as diagonal cut surfaces 2.

The body, particularly a cylindrical one, furthermore has a multilayered winding or roll structure 3, wherein the series of layers runs at a radial spacing about the lengthwise axis 4 of the cylinder, but not like a rope spiral.

Each layer of the series of layers has randomly oriented wood fibers 5, so that the individual layers stand in virtual positive locking to each other, resulting in an adhesive bonding.

The diagonal cut angle preferably lies in the range between 30° and 60° in relation to the lengthwise axis 4, it being critical to form at least one segment 6 tapering to a point, constituting the preferred ignition site.

In particular, the region 6 can be provided with an additional ignition agent to further facilitate the ignition process.

Since the additional fuel, such as paraffin, can be supplied during the press rolling process of the invention, the possibility exists of controlling or dictating the distribution of the additional fuel within the resulting cylindrical body. Thus, one can have a particularly lot of fuel in the cylinder core, or also on the outside. The risk of unwanted volatilization of corresponding components of the fuel is already reduced by the surrounding layers of excelsior fibers. Therefore, no individual packaging of the shaped excelsior body is required.

The shaped bodies produced according to the invention are much more uniform in their external appearance, thanks to the pressing process chosen. Furthermore, the material density and the cross sectional surface can be influenced.

It should also be pointed out that a preferred cylindrical shape of the body results in view of the press forming process mentioned in the sample embodiment. However, alternative pressing processes can also be used, leading to a shape deviating from the round circular form, without leaving the basic notion of the invention.

The invention claimed is:

1. A fire ignition aid device, comprising:
   a generally cylindrically shaped body formed by a multilayered winding or roll structure having a series of layers which run at a radial spacing about a lengthwise axis,
   said shaped body having an initial fuel content including a plurality of wood fibers compacted, said shaped body also having a distributed additional fuel for accelerating fire ignition,
   wherein the cylindrically shaped body has a bottom and a top surface with at least one of the bottom surface or the top surface being cut diagonally to a tapered end to aid fire ignition.

2. The fire ignition aid device according to claim 1, wherein a radius of the series of layers spirally increases constantly from a core of the shaped body outwardly to an envelope of the shaped body.

3. The fire ignition aid device according to claim 1, wherein each layer of the series of layers has randomly oriented wood fibers; and
the layers are connected adhesively.

4. The fire ignition aid device according to claim 1, wherein a diagonal cut angle of the surface that is cut diagonally, in relation to the lengthwise axis, is in the range between 30° and 60°.

5. The fire ignition aid device according to claim 1, wherein the surface that is cut diagonally includes an ignition agent.

6. The fire ignition aid device according to claim 1, wherein both the bottom surface and the top surface of the cylinder are cut diagonally.

7. The fire ignition aid device according to claim 1, wherein the wood fibers have a width of 0.5 mm to 3.5 mm.

8. The fire ignition aid device according to claim 1, wherein the distribution of the additional fuel increases from a core of the shaped body to a surface of the shaped body.

9. A method for producing a press formed fire ignition aid device, comprising:
   placing wood fibers in a roll gap;
   drawing the wood fibers in the roll gap;
   forming a generally cylindrically shaped body having a multilayered winding or roll structure having a series of layers which run at a radial spacing about a lengthwise axis by compressing the wood fibers in the roll gap; and
   cutting diagonally to a tapered end at least one of a bottom surface or a top surface of the shaped body.

* * * * *